Sept. 28, 1926.
E. F. BROOKS
1,601,706
SHUTTER OPERATING FLASHLIGHT DEVICE
Filed Oct. 21, 1925 4 Sheets-Sheet 1
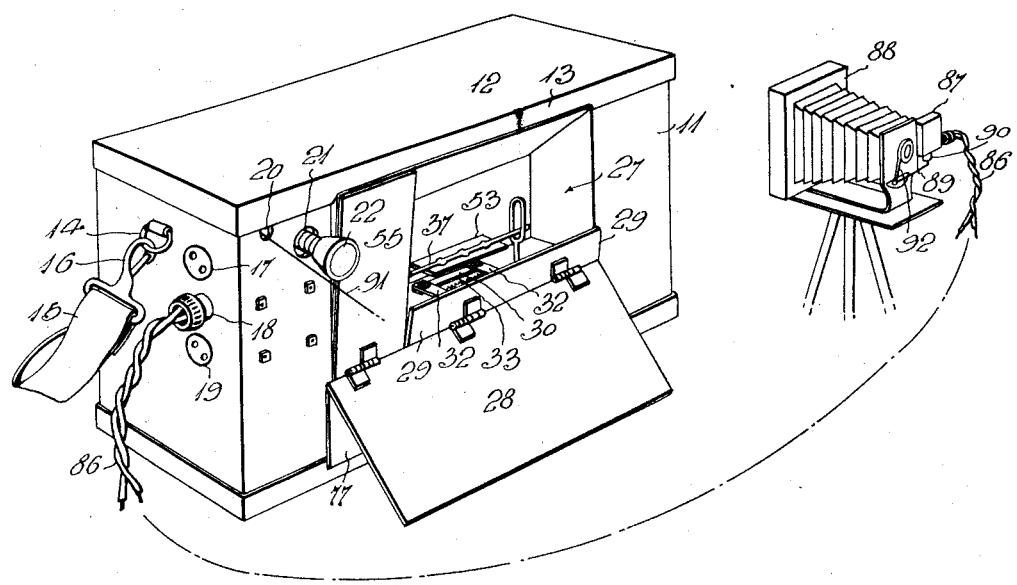
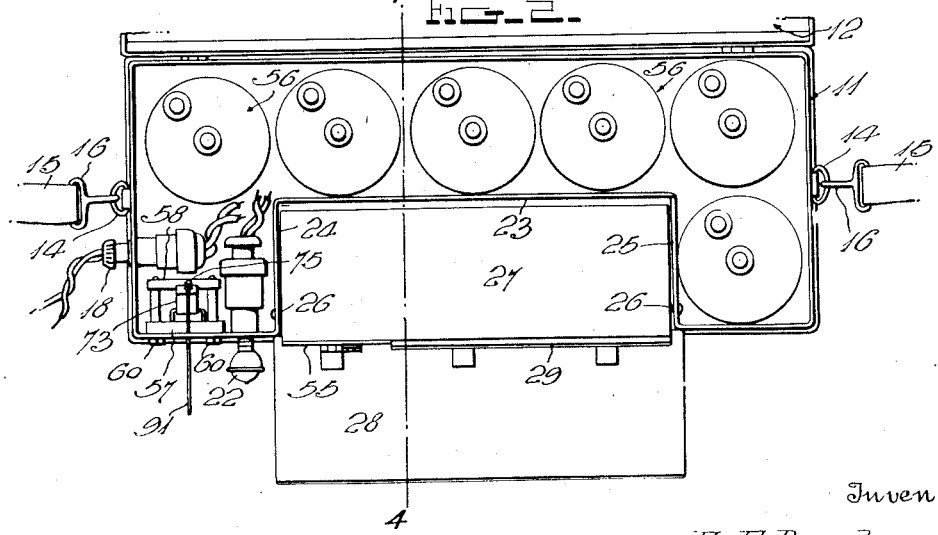
Inventor
E. F. Brooks
By Jordon Stewart
Attorneys

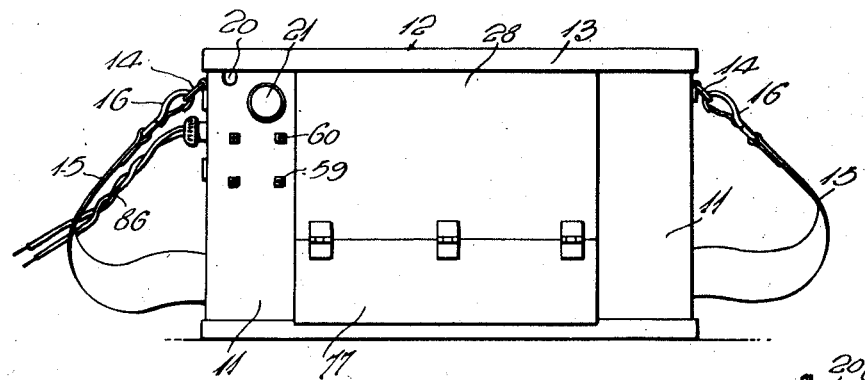
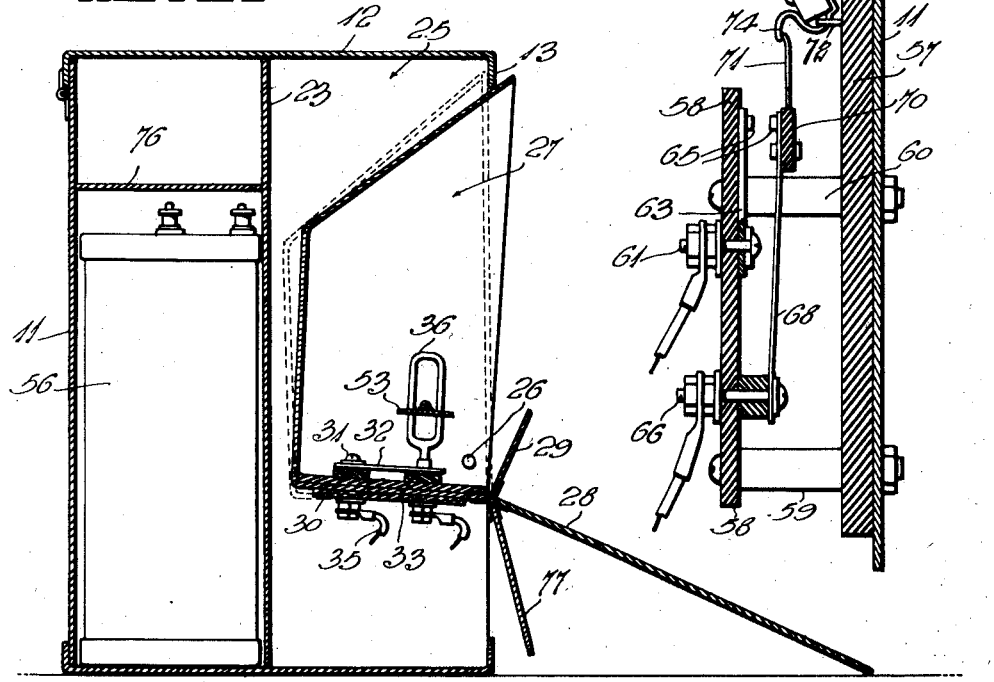

Sept. 28, 1926.  
E. F. BROOKS  
1,601,706  
SHUTTER OPERATING FLASHLIGHT DEVICE  
Filed Oct. 21, 1925   4 Sheets-Sheet 4
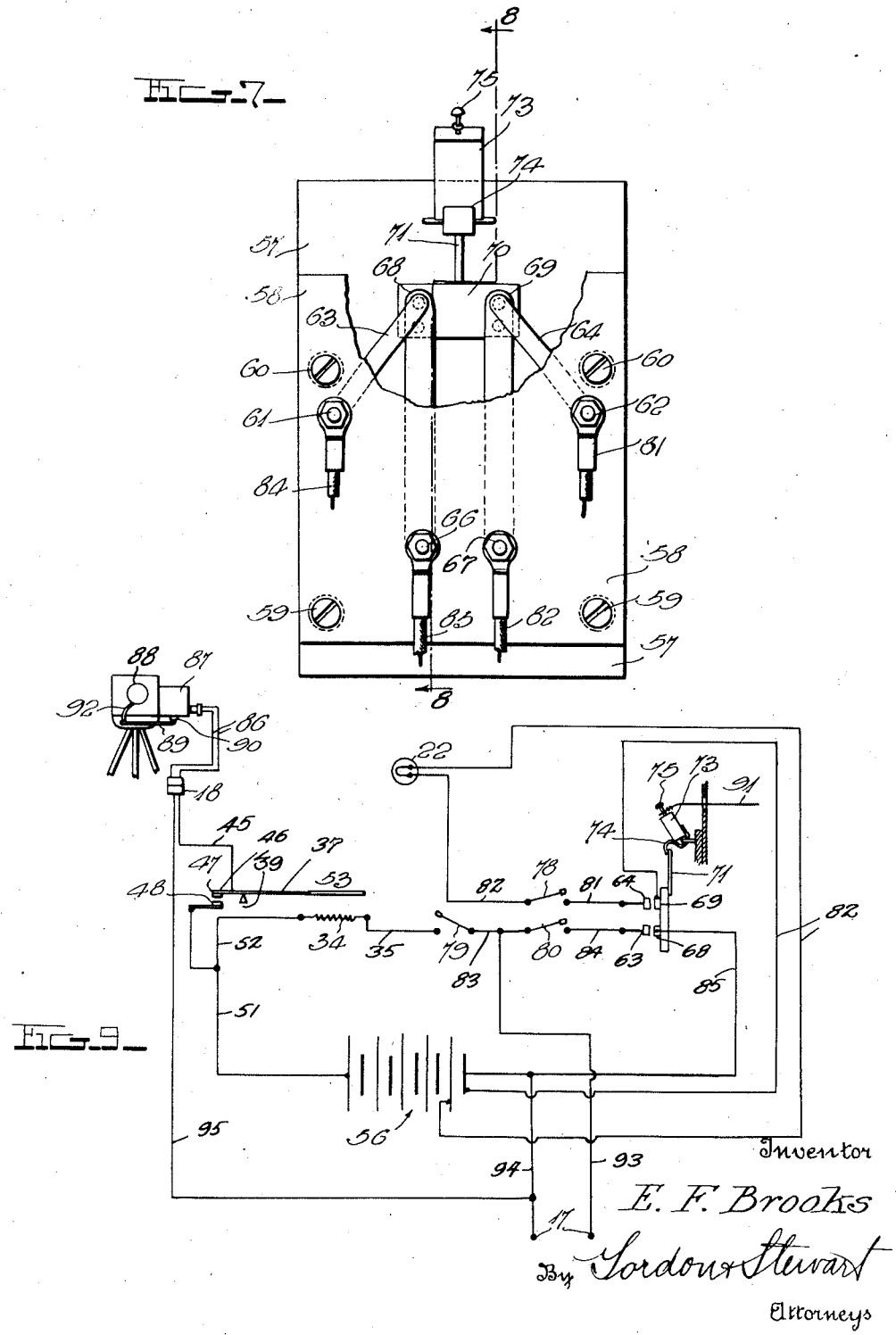

Patented Sept. 28, 1926.

1,601,706

UNITED STATES PATENT OFFICE.

EUGENE F. BROOKS, OF DENVER, COLORADO.

SHUTTER-OPERATING FLASH-LIGHT DEVICE.

Application filed October 21, 1925. Serial No. 63,976.

In the practice of flash photography it is a prime requisite that the subject photographed shall be unaware of the exposure taken and that the picture shall consequently reflect as closely to natural conditions as possible. Where exposures are taken by flash light whether after dark or not it is quite desirable under certain conditions to coordinate the opening of the camera shutter with the operation of the flash light. This will be evident when it is realized that to produce the flash from the burning of magnesium powder compounds a slight period of time elapses between the ignition of the powder and the development of the maximum illumination. Where the shutter of the camera is operated simultaneously with the ignition of the flash light powder, it is found that the shutter is not properly timed but definitely anticipates in its opening and closing the moment of maximum illumination. Also it frequently happens that the degree of illumination or the quantity of illumination may be varied by the use of more or less of the flash light powder and that the operation of the shutter is not varied in its timing to take the greatest advantage from the illumination.

In the development of the mechanism which is described in the following specification prime attention has been paid to the construction of a self-contained flash light device which is thoroughly weather-proof and reliable under all weather conditions.

It is also an object of my invention to arrange the shutter operating mechanism so that the same will be operated positively and invariably on the burning of the flash light powder.

In order to take advantage of the maximum degree of illumination produced under varying quantities of powder used, it is provided that the shutter operating mechanism will respond in its timing to the quantity of magnesium powder compound ignited.

The ignition of the flash light powder under open air conditions in a positive manner is insured by means of an igniter of a new and advantageous character.

The improved device also contemplates as one of its features an interchangeability of operating means when it is desirable to initiate the train of movement either by means of mechanical agencies such as a net-work of trip cords or by means of a remote circuit closing switch operated directly by the action of the subject or if desired by remote control under the hand of the photographer.

Other advantages residing in my improved device will be evident from the following description of my preferred form of structure illustrated by way of example in the accompanying drawings in which—

Fig. 1 is a perspective view of the flash light device as connected to a trap and camera.

Fig. 2 is a top plan view with the cover removed;

Fig. 3 is a front elevation of the device arranged for transportation;

Fig. 4 is a vertical section taken on the line 4—4 of Fig. 2;

Fig. 7 is a back view partly broken away of the front wall showing the trap actuated switches;

Fig. 8 is a vertical section taken on line 8—8 of Fig. 7; and Fig. 9 is a diagram of the electric circuits.

Figure 5:
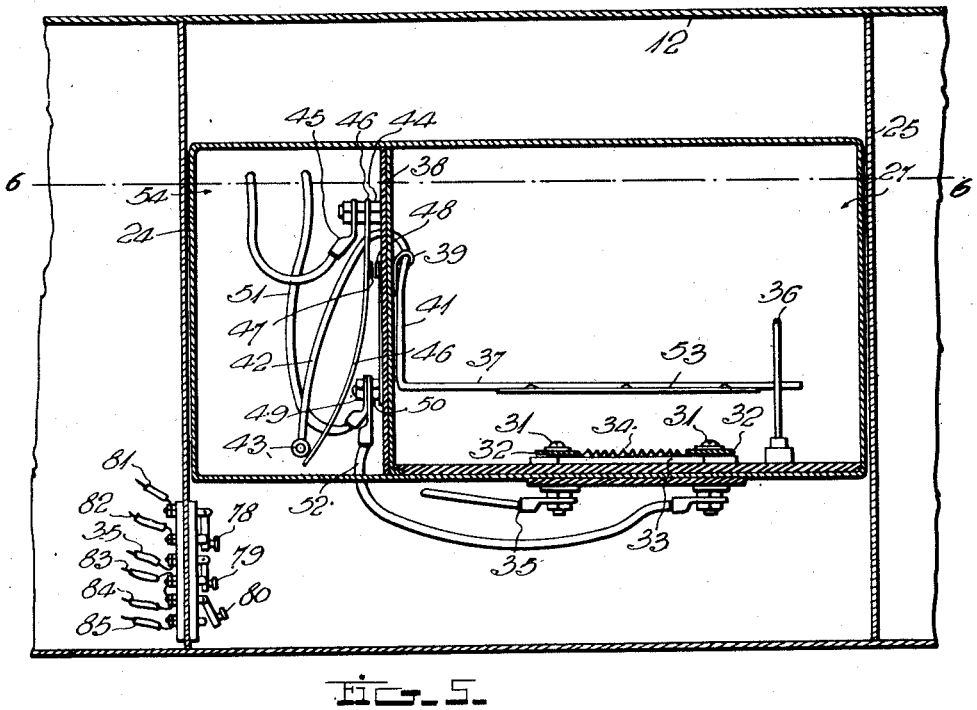
Fig. 5 is a detail front elevation of the flashing and switching compartments.

For the purposes of illustration I have shown in Fig. 1 a cabinet preferably of metal foundation enclosing the operating agencies above outlined. This cabinet is denoted generally by the numeral 11 and consists in a cover 12 hinged at the rear edge and having a depending circumferential flange 13. This casing has attached to the opposite ends a pair of eyelets 14 to which a conventional carrying strap 15 is attached as shown by means of snap hooks 16.

One end of the wall of the case has a series of three electrical outlets 17, 18 and 19 each of which has two insulated contacts of customary form.

The front wall of the case has an opening 20 through which a cord passes connecting the trap or other operating means with the circuit closing trip device to be described hereinafter. An outlet 21 is also arranged in the front wall of the casing to receive a small electric signal light 22. Centrally disposed in the front wall of the casing is a rectangular recess produced by the inner wall 23 and the connecting walls 24 and 25. This recess extends the full height of the casing as shown in Fig. 4. Suitably spaced above the bottom of this recessed compartment the side walls 24 and 25 carry pivot pins 26 which serve to support firing compartment 27. Firing compartment 27 extends upwardly to within a short distance of the top of the casing so that its forward edge is overlapped by the flange 13 of the cover 12. A hinged front plate 28 is carried at the lower front edge of the firing compartment and when closed is also seated behind the flange 13 of the cover; thus adequately protecting the firing compartment and associated devices from the weather. As indicated in Fig. 4 the slight rotation of the firing compartment around pivots 26, 26, permits the upper edge to project beyond the flange 13 so that the cover may be closed down upon the casing protecting the entire contents and allowing the firing compartment only to project outwardly.

A wind shield in the form of a narrow upstanding flange 29 is also pivoted at the lower front edge of the firing compartment and is adapted to be held vertically as a shield for the flash mechanism within. It is also easily turned down if not needed or may be thrown into the lower position by the explosion of the flash light powder. As evident from Fig. 1 the shield 29 extends in front of the flash chamber only and is not coextensive with the member 28.

Figure 6:
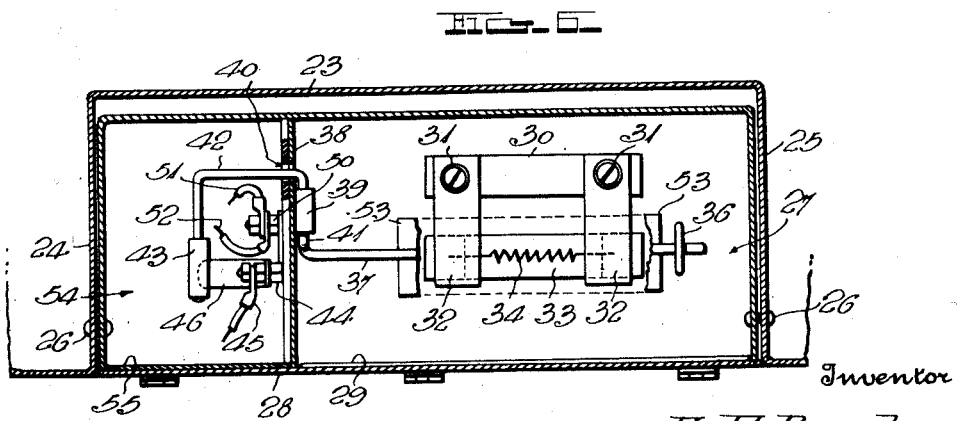
Fig. 6 is a horizontal section on the line 6—6 of Fig. 5.

The floor of the compartment 27 carries an insulating plate 30 having at each end an insulated binding post 31, 31. Extending forwardly from the binding post 31 and spaced parallel to the floor of the compartment are insulated conducting plates 32, 32. These plates are adapted to receive and to hold down the ends of a fuse 33 constructed of insulating material preferably fibre board along the upper surface of which extends a fine metallic wire 34 preferably .003 of an inch in diameter and the ends of which are held firmly under the spring plates 32, 32. The portion of the wire 34 is given a spiral form as shown in Figs. 5 and 6 in order that the same may be entirely surrounded by the flashing powder. The binding posts 31, 31 pass through the floor of the compartment 27 from which they are properly insulated. The ends of the binding posts are connected by conductors 35 and 52 to the source of electricity through the switch as will appear later. Instead of fuse 33 it is evident that other means such as squibs, explosive cartridges and the like may be used as igniters of the flash light powder.

On one side of the floor of the flashing compartment there is an upstanding loop support 36 which serves to receive and control the end of a horizontal rod 37. Near the opposite end of the flashing compartment there is a vertical partition 38 which carries a pivot 39. Immediately in the rear of the pivot 39 the partition is vertically slotted as indicated at 40 in Fig. 6. The horizontal rod 37 has a vertical extension 41 which in turn is extended through the pivot 39 and then turned at right angles to pass through the slot 40 and downwardly as indicated at 42 in Fig. 6. The lower end of extension 42 carries an insulating fibre sleeve 43.

The partition 38 carries on the side opposite from the flashing compartment an insulated binding post 44 which holds a conductor 45 and a curved switch plate 46. The plate 46 extends downwardly and outwardly into sliding contact with the insulated end sleeve 43 of the rod extension 42. Intermediate the switch 46 is carried a contact point 47 which is opposite to a corresponding contact point 48 also carried on partition 38 and insulated therefrom. A contacting bar 49 mounted in insulated relation to the partition 38 connects contact point 48 with a binding post 50 and thence to two conductors 51 and 52.

A vane 53 is attached to the under side of the horizontal rod 37 and lies immediately over the fuse 33. The front of the compartment 54 formed by partition 38 is closed by means of a panel 55 hinged at the base of the member 27.

A greater part of the space within the casing back of the walls 23 and 25 is occupied by an electric battery which may take the form of dry cells connected in series. These dry cells are shown at 56. A certain amount of space however opposite wall 24 is required to house the trip operated circuit closure or switches. This equipment is immediately in rear of and below the opening 20 in the casing. In detail, the mechanism comprises an insulated plate 57 bolted or otherwise attached to the front wall of the casing 11. This plate supports in spaced relation and parallel to it a second plate 58 by means of spacing bolts 59 and 60. Upon plate 58 there are arranged binding posts 61 and 62 from which on the forward face of the plate extend conductors 63 and 64 respectively. Contact points 65 are arranged at the upper extremities of the conductors 63 and 64. The plate 58 carries a pair of binding posts 66, 67 at its lower central portion and from the inner ends of these binding posts extend upwardly a pair of parallel spring conductors 68, 69. Contacting points 65 are mounted on the upper ends of spring members 68, 69, and opposite the contact points on the conductors 63, 64 respectively. The spring members 68, 69 are held in parallel relation by an insulating cross bar 70 arranged at their upper end. This cross bar carries a vertical pin 71. Opposite the upper free end of pin 71 and mounted in a pivot 72 on the back of plate 57 there is a trip lever 73 the lower portion of which carries a detent 74 having a downwardly extending hooked end. The upper free end of the trip lever 73 carries a pin or other means 75 to which the tripping cord 91 may be attached for free movement through the aperture 20 of the casing 11.

As shown in Fig. 4 the cells 56 are covered by a movable horizontal partition 76 which forms a compartment for receiving the flexible conductors and other equipment used in connection with the device.

In like manner space is provided both within and below the flashing compartment to hold miscellaneous equipment. The space in the casing beneath the compartment 27 has at its front a pivoted closure 77. Inside the compartment are formed and mounted upon wall 24 a series of manually operated switches 78, 79 and 80. The switch 78 is connected by appropriate conductors in circuit with one or more dry cells and also with the signal light 22. The conductors for this circuit include the wire 81 leading from the switch 78 to the binding post 62 and conductor 64 while the return circuit 82 connects the other side of the switch 78 with the pilot light, the battery, the movable contact member 69, and its binding post 67.

The second switch 79 is connected to the fuse by means of conductor 35 while its other side is connected by conductor 83 to the double pole outlet 17. The other pole of the outlet 17 is connected to the battery.

The switch 80 has one side connected through conductor 84 with binding post 61 of the stationary contact member 63. The other contact member 68 is connected through its binding post 66 with conductor 85 which in turn is connected with the battery.

A flexible two wire cable with a detachable plug is indicated at 86 and is adapted to connect the outlet 18 with the magnet 87 which is mounted on the camera 88. A link 89 connects the armature 90 of the magnet and the shutter operating lever 92 of the camera.

The outlet 17 has one lead 93, connected through 83 to switch 79 while the other lead 94, connects with the battery. Lead 95 runs from outlet 18 to the common battery return, 94.

In the operation of these devices it is intended that the camera 88 will be placed with the shutter closed and at proper position with respect to the location of the object to be photographed. Where the object to be photographed consists of a wild animal or bird proper means will be taken to spring a net work or to provide a trap either of which will cause the animal or bird to actuate the flash light and the camera without unduly alarming the object. In Fig. 1 there is indicated a trip cord 91 which will connect the net work or trap mechanically with the tripping lever 73.

In setting up the device the flash light compartment 27 will be tilted forward with the front panel 28 lowered and the wind shield adjusted vertically if necessary. The vertical position of the wind shield 29 is of particular benefit in reflecting the full force of the exploding or igniting powder against the vane 53 and also in intensifying the illumination produced. As the compartment 27 is operated forward on pivot points 26 the upper edge is on the outside of the casing and the cover 12 lowered so that the depending flange comes behind the front edge of the compartment shielding all of the equipment against the weather. Before the cover is lowered the cord 91 is connected loosely to pin 75 on lever 73 so that the latter will be in the position indicated in Fig. 8 with its detent 74 holding the pin 71 and the spring members 68, 69 retracted with the contact members 65 separated.

Starting with the switches 78, 79 and 80 in open positions the switch 80 constitutes a safety switch between the battery return wire 85 and the fuse 34. This switch is kept in the open position until the trip device 73 is set against the pin 71 in the manner above described. Switch 80 may then be closed without danger of prematurely igniting the flash.

The switch 79 is normally held in closed position connecting the fuse through conductors 35, 52 and 51 with one side of the battery and in the opposite direction by connector 83 with one side of switch 80 in such manner that both switches must be closed in order to permit the operation of the trip actuated switch.

The switch 78 has connectors 81 and 82 as above described and by means of which the lamp 22 is lighted to indicate that the trip has been released.

In the flash light compartment 27 the removable fuse device 33 is inserted underneath the spring arm 32, 32 and with the helical wire 34 uppermost. A measured quantity of flash light powder is placed upon this wire and by reason of the wire's form it is well embedded in the powder. The degree of illumination will of course depend upon the amount of powder used. In any event the explosive force of the burning powder will be sufficient to elevate the vane 53 and cause the rod 37 to rock around 39 as a pivot. This action causes the extension 42 and the member 43 to move laterally against the spring member 46 and thus bring the contact points 47 and 48 together. The contact is closed when the movement of the extension 42 begins and is maintained closed for an appreciable time during the movement of the extension in order to insure the passage of sufficient current through the circuit to insure the successful operation of the shutter actuating device. As soon as the explosive force of the powder has been expended the reverse movement of the vane and the extension 42 will open the circuit. The loop 36 acts as a keeper to control the movement of the vane 53.

Assuming the trip 73 to be released by the cord 91 the circuit through the fuse 34 is closed bringing the latter to incandescence and thus igniting the powder. The ignition of the powder is a development demanding an appreciable lapse of time before the maximum illumination is attained and consequently the closing of the shutter actuating circuit is correspondingly delayed until the illumination has reached a maximum. In this way the shutter of the camera may be operated to obtain practically instantaneous exposures under any and all circumstances.

From the wiring diagram in Fig. 9 it will be evident that by means of conductors 94 and 93 leading on the one end through switch 79 to the fuse and on the other end to the opposite pole of the battery, the outlet 17 may be connected in circuit with an electrically operating switch or trap. This trap may then take the place of the mechanically operated net work or web and its associated switch contacts for the fuse circuit.

In like manner the outlet 17 may be connected with a push button under the control of the operator himself.

With a device constructed as above described it is possible to obtain the coordinated operation of a flash light means with a variable speed camera shutter. This operation may be set in motion by a number of causes several examples of which have been outlined and which include tripping means operated at the flash light device from the area upon which the camera is focused; or by an electric circuit closed by means of a trap or similar device within the field of view such as an animal run-way or the like, or again the mechanism may be actuated by remote control by an operator. Other means will readily suggest themselves in connection with the device as described. In like manner the fuse device illustrated is typical of other equivalent devices which may be used to actuate the mechanism through the agency of the burning flash-light compound.

It is also evident that visual signal means is provided to advise the operator that the trip mechanism has been released.

A devise is thus provided which is proof against the handicaps of stormy weather, is safe in operation and easily transported and cared for.

The device as above described is but one of numerous forms which the invention may take and various modifications may be constructed within the scope of the appended claims.

What I claim is:

1. In combination, a pan for flash-light powder, an electrically operated igniter in said pan, a vane pivoted above said igniter, a switch operated by said vane, and electrical shutter-operating means actuated by said switch.

2. In combination, a pan for flash-light powder, an electrically operated igniter in said pan, a vane pivoted above said igniter, shutter-operating means, a pair of spaced contacts, means to hold the contacts together during movement of the vane, and an electric circuit connecting the contacts with the shutter-operating means.

3. In a flash-light device, a casing including a cover, and a flash-light compartment mounted within the casing, said cover being adapted to be closed over said casing with the compartment exposed in operating position beneath the cover.

4. In a flash-light device, a casing including a hinged cover, a flash-light compartment in said casing, a closure for the compartment, said closure adapted to be held by the cover.

5. In a flash-light device, a casing including a hinged cover having a depending flange, a flash-light compartment mounted in the side wall of the casing, an upwardly sloping front edge to the compartment extending back of the flange of the cover.

6. In a flash-light device, a casing, a flash-light compartment mounted in the side wall of the casing, a closure and a shield both hinged to the lower edge of the compartment.

7. In a flash-light device, a casing, a flash-light compartment mounted in the side wall of the casing, a switch carried in said compartment responsive to the ignition of the powder, and circuit connections from the switch for a shutter-operating means.

8. In a flash-light device, a casing, a flash-light compartment, in said casing, igniting means carried by said compartment, a switch in said compartment responsive to the ignition of the powder, a battery and a circuit closer in said casing, and circuit connections from the circuit closer to the igniting means and from the switch for a shutter-operating means.

9. In a flash-light device, a casing, a flash-light compartment in said casing, an igniter in the base of the compartment, a vane pivoted above the igniter, a switch for a shutter-operating means actuated by said vane, a trip, a circuit-closer released by said trip, and connections between said circuit-closer and igniter.

10. In a flash-light device, a pan for flash light powder, a thermo-electric igniter located in said pan, a member located within said pan in a position to be subjected to the explosive force of the powder upon ignition, an electrical circuit, switch contact apparatus adapted to close said electrical circuit when actuated by said member including spring inertia means whereby said circuit is maintained closed subsequent to the ignition of the flash-light powder, and electrical shutter-operating means intercalated in said electrical circuit.

In testimony whereof, I have hereunto affixed my signature.

EUGENE F. BROOKS.